United States Patent [19]
DeLong et al.

[11] Patent Number: 5,912,731
[45] Date of Patent: Jun. 15, 1999

[54] HARTMANN-TYPE OPTICAL WAVEFRONT SENSOR

[75] Inventors: Raymond K. DeLong, Palos Verdes Estates; Richard A. Hutchin, Calabasas, both of Calif.

[73] Assignee: TRW Inc., Redondo Beach, Calif.

[21] Appl. No.: 08/984,751

[22] Filed: Dec. 4, 1997

[51] Int. Cl.⁶ ................................. G01J 1/00; G01J 1/20
[52] U.S. Cl. ........................................ 356/121; 280/201.9
[58] Field of Search ........................... 356/121; 250/201.9

[56] References Cited

U.S. PATENT DOCUMENTS

| | | | |
|---|---|---|---|
| 4,141,652 | 2/1979 | Feinleib | 356/121 |
| 5,233,174 | 8/1993 | Zmek | 356/121 |

*Primary Examiner*—Robert H. Kim
*Assistant Examiner*—Amanda Merlino
*Attorney, Agent, or Firm*—Michael S. Yatsko

[57] ABSTRACT

An optical wavefront sensor for measuring phase tilt in two dimensions across the cross section of a beam (14), using only a single lenslet array (26) and a single camera sensor array (28). The rectangular lenslet array (26) is oriented at 45 degrees to first and second orthogonal sets of axes defining multiple points of interest (22') in the beam cross section, such that each lenslet subaperture is centered (at 40) between adjacent points of interest on the first and second axes. The points of interest (22') are locations corresponding to the positions of actuators (22) in an adaptive optics system. The camera sensor array (28) has more cells per unit area than there are subapertures per unit area. Only selected cells are activated, to provide for measurements at the approximate mid-points of lines between adjacent points of interest (22') on the first and second orthogonal axes. Thus the sensor array (28) has enough active cells to effect measurements in both orthogonal directions without interference between the cells used for measurement in the two directions, and without the need for multiple lenslet arrays or sensor arrays.

10 Claims, 4 Drawing Sheets

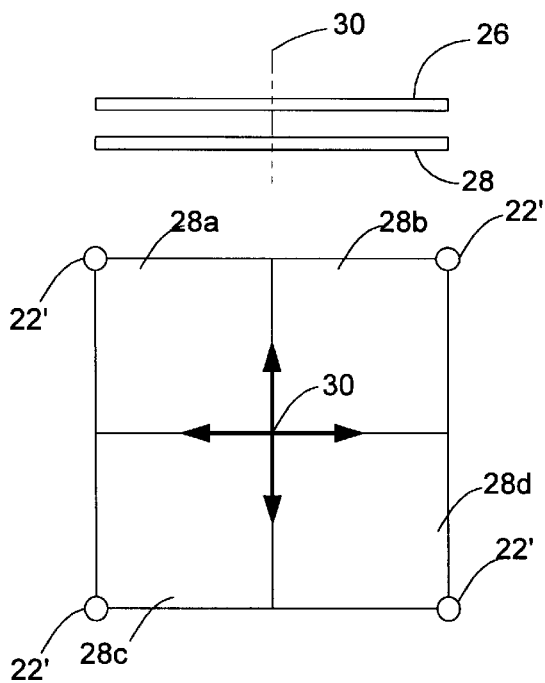
FIG. 2 (PRIOR ART)
FIG. 3 (PRIOR ART)
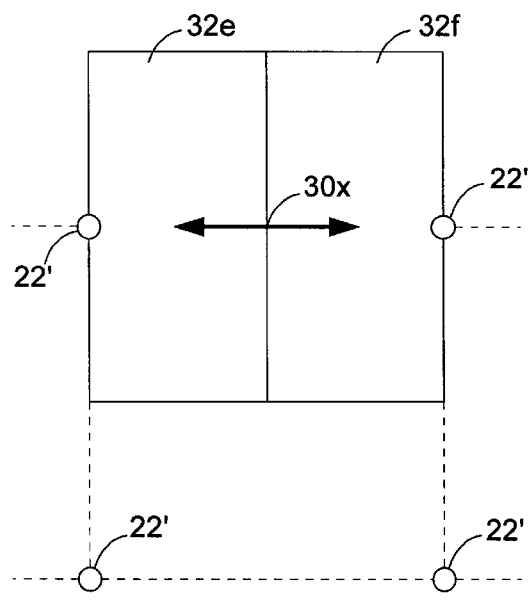
FIG. 4 (PRIOR ART)
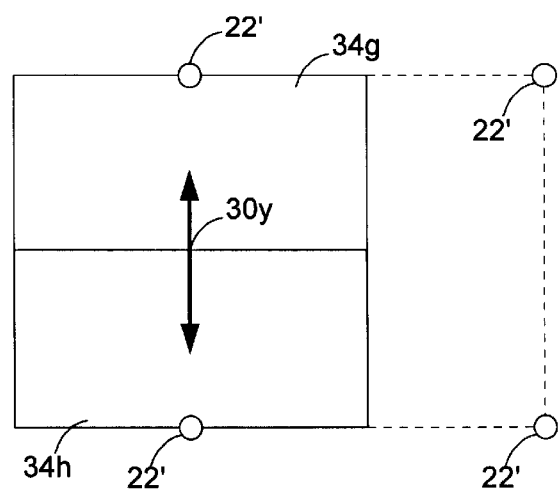
FIG. 5 (PRIOR ART)

HARTMANN-TYPE OPTICAL WAVEFRONT SENSOR

BACKGROUND OF THE INVENTION

This invention relates generally to adaptive optics systems and, more particularly, to techniques for measuring relative phase tilt of an optical beam in two dimensions across a planar array. Adaptive optics systems employ adjustable optical elements, such as deformable mirrors, to compensate for aberrations in an optical beam. Aberrations may be caused, for example, by propagation of the beam through the atmosphere. In a typical adaptive optics system, the aberrated beam is reflected from a deformable mirror having many small elements that are adjustable in position, using a separate actuator associated with each movable mirror element. Part of the reflected beam is split off and directed to impinge on a sensor array, which provides measurements indicative of wavefront distortion in the reflected beam. The wavefront distortion measurements are then fed back to the deformable mirror to provide continuous corrections by appropriately moving the mirror elements.

The principal components of a wavefront sensor array are an array of small lenses, referred to as a lenslet array, and camera having an array of sensor elements. This configuration is referred to as the Shack-Hartmann wavefront sensor. The lenslet array, when disposed in the path of the beam, produces multiple elemental portions of the beam, referred to as subapertured portions. Each lenslet in the lenslet array processes a subaperture of the whole beam. The lenslet array typically has each of its lenslets positioned on a square grid, although the whole array may not be square, and is usually a polygon shape conforming approximately to the outline of a circular beam. The camera sensor elements are usually square or rectangular in shape and are also usually arranged in a square or rectangular grid pattern, angularly aligned to be parallel with the lenslet grid pattern.

There are two configurations of the Shack-Hartmann sensor in the prior art. In one configuration, each subaperture or lenslet is centered equidistantly with respect to the positions of four adjacent mirror actuators. Moreover, the lenslet is centered over a group of four camera sensor elements, referred to as a quad-cell. A measure of phase tilt in one direction is derived from the difference between signal outputs from each of two pairs of the cells in the quad-cell. For example, if the cells and their output signals in a quad-cell are labeled A, B, C and D, where cells A and B are aligned in the X-axis direction and cells A and C are aligned in the Y-axis direction, the X-axis tilt is determined from $[(A+C)-(B+D)]/[A+B+C+D]$. Similarly, the Y-axis tilt is determined from $[(A+B)-(C+D)]/[A+B+C+D]$.

The principal drawback of this approach is that it would be preferable to measure the local X-axis tilt between two adjacent actuators on a common X axis, and to measure the Y-axis tilt between two adjacent actuators on a common Y-axis. An alternate configuration of the prior art avoids this disadvantage but, unfortunately, introduces another difficulty. In this alternate configuration, two lenslet arrays and two arrays of detectors are needed, one to measure the X-axis tilt and the other to measure the Y-axis tilt. The lenslet array for measuring the X-axis tilt is positioned such that each subaperture or lenslet is positioned midway between the grid positions corresponding to two adjacent actuators on a common X axis. Similarly, the other lenslet array is positioned such that each subaperture or lenslet is positioned midway between the grid positions corresponding to two adjacent actuators on a common Y axis. For X-axis tilt measurement, a camera sensor array provides a bi-cell, i.e. two adjacent sensor cells located between the adjacent actuators in the common X axis. Light from the lenslet is, therefore, normally positioned over the boundary between the two cells in the bi-cell, and any tilt in the X-axis direction is determined from the difference in output signals from the two cells in the bi-cell. Similarly, for Y-axis tilt measurement, a separate camera sensor array provides a bi-cell between two grid positions corresponding the adjacent actuators in the common Y axis. Thus, Y-axis tilt is derived from the difference between output signals from two cells in the bi-cell. The difficulty introduced by this configuration is that two lenslet arrays and two cameras are required. The two lenslet arrays will necessarily interfere with each other physically if they are placed in a single beam being analyzed. Use of beam splitters to provide two separate beams for analysis by the two lenslet arrays and cameras introduces further complications in terms of alignment.

Ideally, what is needed is a technique for measuring phase tilt by sensor elements positioned between adjacent actuators in both the X axis and adjacent actuators in the Y axis, but without the difficulties of physical interference or alignment posed by the alternate configuration of the prior art. The present invention fulfills this need.

SUMMARY OF THE INVENTION

The present invention resides in a wavefront sensor for use in measuring local phase tilt in two dimensions over an optical beam cross section, using only one lenslet array and one camera sensor array. The measurements are made with respect to first and second orthogonal sets of grid lines intersecting at points of interest corresponding to positions of optical device actuators. Briefly, and in general terms, the wavefront sensor of the invention comprises a lenslet array and a camera sensor array. The lenslet array has a plurality of lenslets with optical axes positioned on points of intersection of a rectangular grid, which is oriented at an angle to the first and second orthogonal sets of grid lines, wherein the lenslets are spaced in such a manner that the lenslet optical axes are positioned on the first and second orthogonal sets of grid lines, between adjacent points of interest at the intersections of those lines. The camera sensor array has a plurality of sensor cells disposed in a rows and columns oriented parallel with the first and second orthogonal sets of grid lines and positioned adjacent to the lenslet array to receive light passing through the lenslets. Only selected cells of the sensor array, corresponding approximately with the positions of the lenslet optical axes, are activated to provide a measure of phase tilt in the directions of the orthogonal sets of grid lines and only one lenslet array and one camera sensor array are required to provide tilt measurements in both orthogonal directions.

More specifically, in one embodiment of the invention the camera sensor array is a rectangular array of bi-cells, each of which is approximately one-fourth the area of a square defined by four adjacent points of interest. Only alternate bi-cells in each column and row of the sensor array are activated; and each active bi-cell is positioned at the midpoint of a line between two adjacent points of interest, to measure the tilt with respect to the direction of that line. In this illustrative embodiment, each bi-cell pixel is approximately square.

In another embodiment of the invention, the camera sensor array is a rectangular array of cells, each of which is approximately one-ninth the area of a square defined by four adjacent points of interest. In this embodiment only selected adjacent pairs of cells in each column and row of the sensor array are activated, to form active bi-cells spaced along the orthogonal sets of grid lines. Only four of every nine cells are activated and each active bi-cell is positioned at the approximate mid-point of a line between two adjacent points of interest, to measure the tilt with respect to the direction of that line. In this embodiment as illustrated, each cell is approximately square.

In both the disclosed embodiments of the invention, the rectangular array defining the lenslet array is oriented at approximately 45 degrees to the camera sensor array and the first and second orthogonal sets of grid lines.

The invention may also be defined as a method for measuring local phase tilt in two dimensions over an optical beam cross section, along first and second orthogonal sets of grid lines intersecting at points of interest corresponding to positions of optical device actuators. The method comprises the steps of passing a beam through a lenslet array having a plurality of lenslets formed on a rectangular grid; orienting the lenslet array with its rectangular grid of lenslets at an angle to the first and second orthogonal sets of grid lines; positioning the lenslet array such that each lenslet has a subaperture centered close to the midpoint of a line between two adjacent points of interest; placing a single camera sensor array next to the lenslet array to receive light therefrom, wherein the sensor array has a plurality of sensor cells greater in number, per unit area, than the number of lenslets per unit area; orienting the sensor array to coincide with the first and second sets of orthogonal grid lines; activating selected cells in the sensor array, wherein the selected cells are bicells positioned approximately over the center of each subaperture of the lenslet array; and obtaining a bi-cell measurement for each pair of adjacent points of interest, the bi-cell measurement being indicative of phase tilt in the direction between the adjacent points of interest.

More specifically, the camera sensor array is a rectangular array of bi-cells, each of which is approximately one-fourth the area of a square defined by four adjacent points of interest. The activating step includes activating only alternate bi-cells in each column and row of the sensor array, and each active bi-cell is positioned at the mid-point of a line between two adjacent points of interest, to measure the tilt with respect to the direction of that line.

In another embodiment of the method, the camera sensor array is a rectangular array of cells, each of which is approximately one-ninth the area of a square defined by four adjacent points of interest, and the activating step includes activating only selected adjacent pairs of cells in each column and row of the sensor array, to form active bi-cells spaced along the orthogonal sets of grid lines. Only four of every nine cells are activated and each active bi-cell is positioned at the mid-point of a line between two adjacent points of interest, to measure the tilt with respect to the direction of that line.

In both disclosed embodiments of the method, the step of orienting the lenslet array includes orienting it at an angle of approximately 45 degrees to the first and second orthogonal sets of grid lines.

It will be appreciated from the foregoing summary that the present invention represents a significant advance in the field of wavefront sensors for use in adaptive optics systems. In particular, the invention provides two-dimensional measurements of phase tilt over the cross section of a beam, but using only a single lenslet array and a single camera sensor array. Other aspects and advantages of the invention will become apparent from the following more detailed description, taken in conjunction with the drawings.

BRIEF DESCRIPTION OF THE DRAWINGS

FIG. 2 is a fragmentary diagram showing the wavefront sensor array of FIG. 1 as including a lenslet array and a camera sensor array;

FIG. 3 is diagram showing the positional relationship of the camera sensor array with respect to the lenslet array in a wavefront sensor of the prior art;

FIGS. 4 and 5 are diagrams showing the positional relationship of two camera sensor arrays with respect to respective lenslet arrays in another wavefront sensor of the prior art;

DESCRIPTION OF THE PREFERRED EMBODIMENTS

Figure 1:
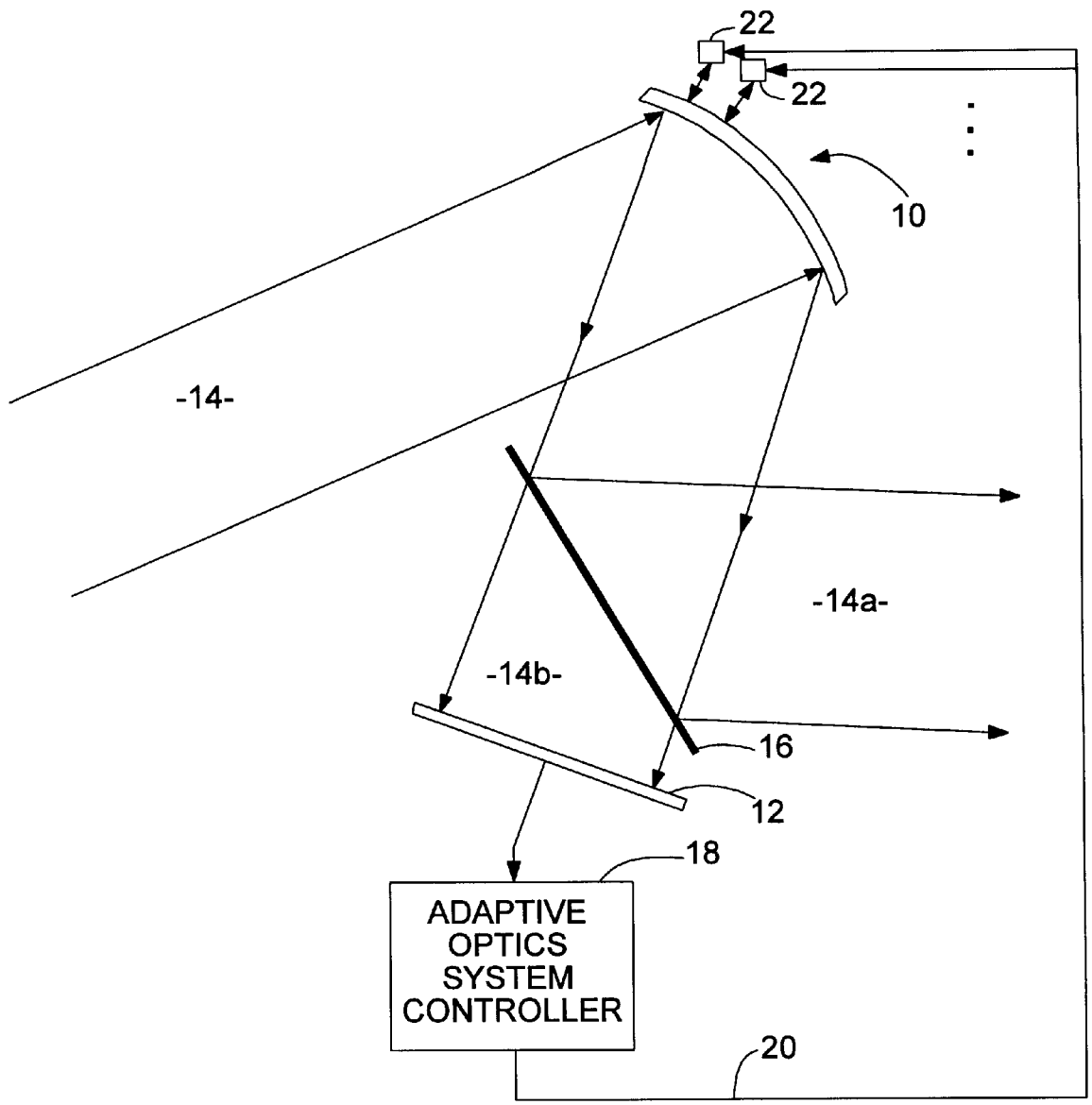
FIG. 1 is a block diagram of an adaptive optics system of the prior art.

As shown in the drawings for purposes of illustration, the present invention pertains to techniques for measuring elemental phase tilt in a light beam that has been subject to wavefront distortion, such as by propagation through the atmosphere. Adaptive optics systems are employed to compensate for wavefront distortion by means of an adjustable optical element, such as a deformable mirror. Typically, a deformable mirror has a continuous but flexible reflective surface that is deformed from the non-reflective side of the mirror by many elemental actuators, such as pistons moved by electrical signals. As shown in FIG. 1, an adaptive optics system may include a deformable mirror of this general type, as indicated by reference numeral 10, and a wavefront sensor array 12. A light beam 14 incident on the deformable mirror 10 is reflected into beam splitter 16 providing two output beams 14a and 14b. The beam 14a is directed to a device (not shown) that makes use of the information carried by the beam. If the adaptive optics system is part of an astronomical telescope, for example, the beam 14a will be directed into conventional components of a telescope (not shown). The other output beam 14b impinges on the wavefront sensor array 12. Output signals from the array 12 are processed in an adaptive optics controller 18, which generates control signals on lines 20 to control the individual actuators 22 in the deformable mirror 10. The controller 18 deforms the mirror 10 in such a manner as to reduce the wavefront distortion to near zero.

As shown in FIG. 2, the principal components of the wavefront sensor array 12 are a lenslet array 26 and a camera sensor array 28, only portions of which are shown in the figure. The lenslet array 26 contains a large number of small lenses, referred to as lenslets, positioned on a rectangular grid pattern. In FIG. 2, one of the lenslets is positioned with its axis on centerline 30.

FIG. 3 shows a fragmentary portion of the camera sensor array 28 in plan view, including a quad-cell comprising cells 28a, 28b, 28c and 28d. In one prior art configuration, the lenslet array 26 is positioned with respect to the camera sensor array 28 such the each centerline of a lenslet passes through the center of a quad-cell, as indicated in the figure. Moreover, the size of the quad-cell 28a–28d is such that its four corners correspond to the positions of four adjacent mirror actuators 22. These positions are referenced by numeral 22' in the drawings. When light passing through the particular lenslet that is positioned above the quad-cell 28a–28d falls precisely in the center of the quad-cell, each of the four cells 28a–28d will produce an identical electrical output signal. The aperture of each lenslet is referred to as a beam subaperture and, for purposes of explanation, each subaperture is considered to encompass a square area, in this case corresponding to the area of the quad-cell 28a–28d in FIG. 3. The center of the subaperture is the centerline 30.

If light from the lenslet is not exactly centered on the quad-cell 28a–28d, the degree of "tilt" of the beam in an X-axis direction and a Y-axis direction can be determined from the signals output from the four elements 28a–28d of the quad-cell. The arrows emanating from the center 30 of the quad-cell indicate the directions of X-axis and Y-axis tilt. More specifically, if the signals output from the quad-cell 28a–28d are A, B, C and D, respectively, the Y-axis tilt is proportional to:

$$\frac{(A+B)-(C+D)}{(A+B+C+D)}.$$

Similarly, the X-axis tilt is proportional to:

$$\frac{(A+C)-(B+D)}{(A+B+C+D)}.$$

Using these expressions, the adaptive optics system controller 18 can make appropriate adjustments to the actuators 22 to eliminate the tilt in each direction. A significant difficulty with this configuration is that the tilt measurements are made at the center of each quad-cell, but these measurements have to be translated into corrections applied at the positions of the corners of the quad-cell, where the actuators are located. Obviously, movement of any one of the actuators 22 at a corresponding corner 22' of the quad-cell results in a tilt change in both the X-axis and Y-axis directions, as measured at the center of the quad-cell. Ideally, then, it would be desirable to use a configuration in which tilt measurements were made between two adjacent actuator positions in the same X-axis or Y-axis line.

The configuration depicted in FIGS. 4 and 5 avoids the drawback of the configuration discussed above by providing two separated lenslet arrays and two corresponding camera sensor arrays, to make two sets of tilt measurements. As shown in FIG. 4, a first lenslet array with centerline at 30x is positioned with its subaperture nominally over the center of a bi-cell 32e–32f that is part of a first camera sensor array 32. The bi-cell 32e–32f is also centered over a horizontal (X-axis) line joining two adjacent actuator positions 22', as shown in FIG. 4. If the electrical output signals generated by the cells 32e and 32f are E and F, respectively, the X-axis tilt of the subaperture beam is proportional to:

$$\frac{E-F}{E+F}.$$

As shown in FIG. 5, the second lenslet array has a center at 30y positioned at the mid-point between two adjacent actuator positions 22' on a Y-axis line. A second camera sensor array has a bi-cell 34g–34h also positioned over the centerline 30y to provide a measurement of the Y-axis tilt of the subaperture beam. If the bi-cell 34g–34h output signals are G and H, respectively, the Y-axis tilt is proportional to:

$$\frac{G-H}{G+H}.$$

Unfortunately, the two lenslet arrays in this configuration would interfere physically if placed in the same beam, so the usual approach is to employ an additional beam splitter (not shown) and to perform the X-axis and Y-axis tilt measurements with separate beams. This poses alignment difficulties that will almost inevitably have an adverse effect on performance. Moreover, the use of a second lenslet array and a second camera sensor array increases the total cost of the device.

Figure 6:
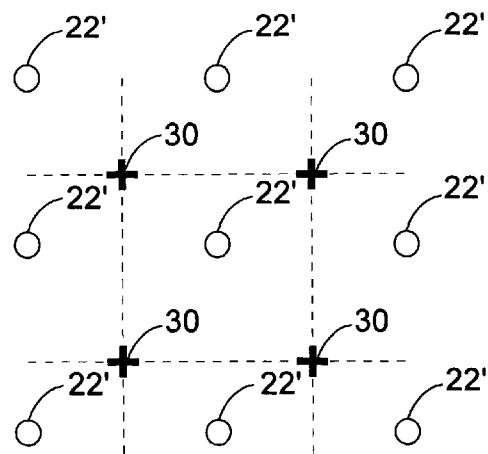
FIG. 6 is a diagram showing the positional relationship of the lenslet array of FIG. 3 with respect to deformable mirror actuators.
Figure 7A:
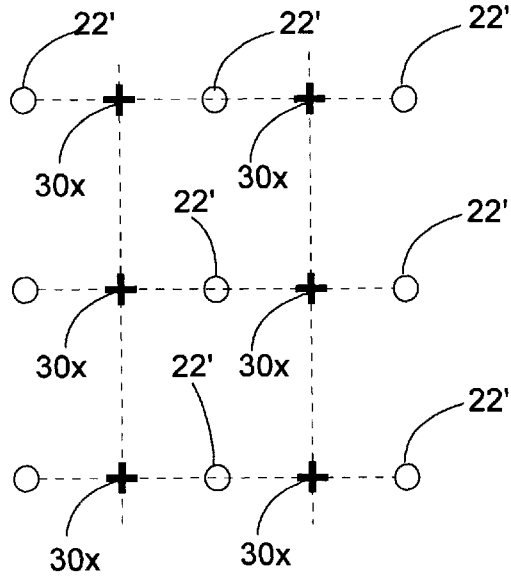
FIGS. 7a and 7b are diagrams similar to FIG. 6, but showing the positional relationships of the lenslet arrays of FIGS. 4 and 5, respectively, with respect to deformable mirror actuators.
Figure 7B:
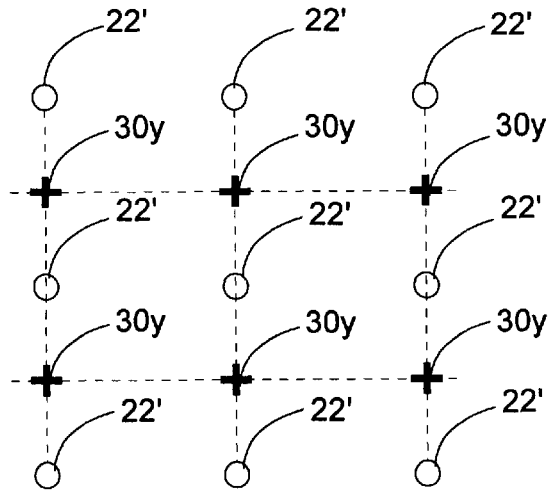

FIGS. 6, 7a and 7b depict, for the two configurations of the prior art, the positional relationship between actuator positions 22' and the centerline positions of the lenslet arrays. For the first configuration, as shown in FIG. 6, each lenslet centerline 30 is positioned equidistantly from four adjacent actuator positions 22'. Similarly, for the second prior art configuration, as shown in FIGS. 7a and 7b, first lenslet centerline positions 30x are each positioned midway between adjacent actuator positions 22' on the same horizontal (X-axis) line, and second lenslet centerline positions 30y are positioned between adjacent actuator positions on the same vertical (Y-axis) line. It will also be apparent from FIGS. 6, 7a and 7b that, in the prior art configurations, the lenslets in the lenslet arrays are all disposed on rectangular or square grid patters that are angularly aligned with the camera sensor array and with the grid pattern on which the actuator positions 22' are disposed.

Figure 8:
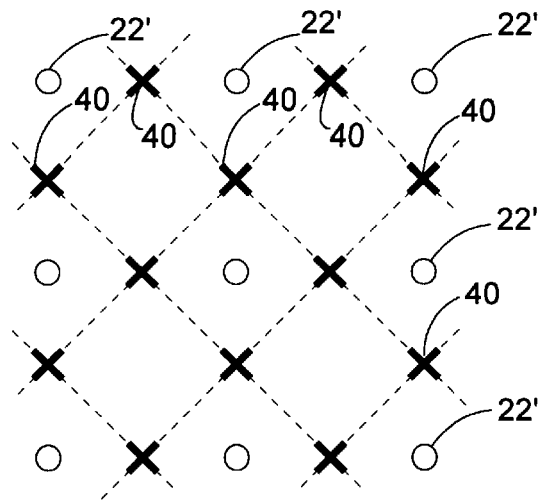
FIG. 8 is a diagram showing, in accordance with the invention, the positional and angular relationship of a lenslet array with respect to deformable mirror actuators.
Figure 9:
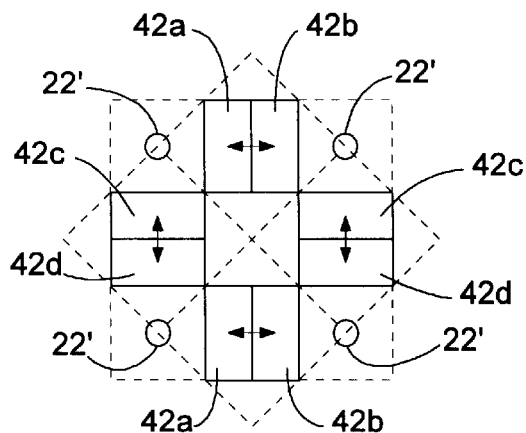
FIG. 9 is a diagram showing, in accordance with one embodiment of the invention, the selection of active pixels in a camera sensor array, in relation to the positions of deformable mirror actuators and subapertures of the lenslet array.

In accordance with the present invention, a lenslet array with lenslet centerlines 40 is positioned with its grid pattern at 45 degrees to the grid pattern on which the actuator positions 22' are disposed, as depicted in FIG. 8, and a single camera sensor array 42 having selected X bi-cells 42a–42b and selected Y bi-cells 42c–42d positioned midway between adjacent actuator positions 22' in X-axis and the Y-axis, respectively, as depicted in FIG. 9. Because the bi-cells of the camera sensor array 42 are smaller, by a factor of two in at least one dimension, than those used in the configuration of FIGS. 4 and 5, both X-axis and Y-axis tilt measurements can be made without physical interference between the two sets of required bi-cells. In the FIG. 9 configuration, only half of the total number of bi-cells in the array 42 are activated. The X-axis and Y-axis tilt measurements are derived from the output signals from the activated cells. Specifically, the X-axis tilt is proportional to outputs (A-B) derived from bi-cell 42a–42b, and the Y-axis tilt is proportional to output difference (C-D) derived from bi-cell 42c–42d.

Figure 10:
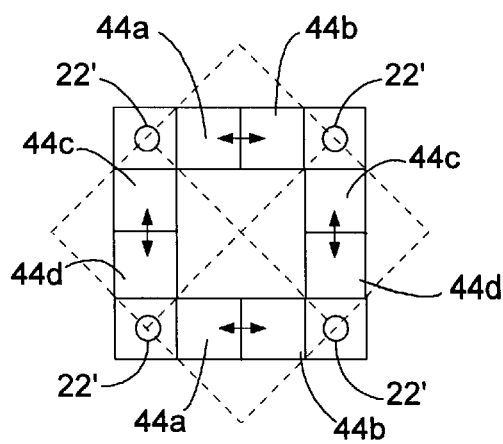
FIG. 10 is a diagram similar to FIG. 9, but showing the selection of active pixels in a camera sensor array in accordance with an alternate embodiment of the invention.

In the FIG. 10 configuration the camera sensor array, referred to by numeral 44, has even smaller bi-cells. Each of the two cells 44a, 44b or 44c, 44d, in a bi-cell in FIG. 10, measures one-third of the spacing between actuator positions 22'. It will also be observed from FIG. 10 that only four of every nine cells are activated in this configuration.

Accordingly, the invention provides the advantages of the prior art configuration of FIGS. 4 and 5, wherein tilt measurements in each axis are made midway between adjacent actuator positions in that axis, but only a single lenslet array and a single camera sensor array are needed. It will be appreciated, therefore, that the invention represents a significant advance in the field of wavefront sensors for use in adaptive optics systems. It will also be appreciated that, although the invention has been described in detail for purposes of illustration, various modifications may be made without departing from the spirit and scope of the invention. Accordingly, the invention should not be limited except as by the appended claims.

What is claimed is:

1. A wavefront sensor for use in measuring local phase tilt in two dimensions over an optical beam cross section, along first and second orthogonal sets of grid lines intersecting at points of interest corresponding to positions of optical device actuators, the wavefront sensor comprising:

a lenslet array having a plurality of lenslets with optical axes positioned on points of intersection of a rectangular grid, which is oriented at an angle to the first and second orthogonal sets of grid lines, wherein the lenslets are spaced in such a manner that the lenslet optical axes are positioned on the first and second orthogonal sets of grid lines, between adjacent points of interest at the intersections of those lines; and a camera sensor array having a plurality of sensor cells disposed in a rows and columns oriented parallel with the first and second orthogonal sets of grid lines and positioned adjacent to the lenslet array to receive light passing through it, wherein only selected cells of the sensor array, corresponding approximately with the positions of the lenslet optical axes, are activated to provide a measure of phase tilt in the directions of the orthogonal sets of grid lines;

whereby only one lenslet array and one camera sensor array are required to provide tilt measurements in both orthogonal directions.

2. A wavefront sensor as defined in claim 1, wherein:

the camera sensor array is a rectangular array of bi-cells, each of which is approximately one-fourth the area of a square defined by four adjacent points of interest;

only alternate bi-cells in each column and row of the sensor array are activated; and each active bi-cell is positioned at the mid-point of a line between two adjacent points of interest, to measure the tilt with respect to the direction of that line.

3. A wavefront sensor as defined in claim 2, wherein:

each bi-cell pixel is approximately square.

4. A wavefront sensor as defined in claim 1, wherein:

the camera sensor array is a rectangular array of cells, each of which is approximately one-ninth the area of a square defined by four adjacent points of interest;

only selected adjacent pairs of cells in each column and row of the sensor array are activated; to form active bi-cells spaced along the orthogonal sets of grid lines;

only four of every nine cells are activated; and each active bi-cell is positioned at the approximate midpoint of a line between two adjacent points of interest, to measure the tilt with respect to the direction of that line.

5. A wavefront sensor as defined in claim 4 wherein:

each cell is approximately square.

6. A wavefront sensor as defined in claim 1, wherein the rectangular array defining the lenslet array is oriented at approximately 45 degrees to the first and second orthogonal sets of grid lines.

7. A method for measuring local phase tilt in two dimensions over an optical beam cross section, along first and second orthogonal sets of grid lines intersecting at points of interest corresponding to positions of optical device actuators, the method comprising the steps of:

passing a beam through a lenslet array having a plurality of lenslets formed on a rectangular grid;

orienting the lenslet array with its rectangular grid of lenslets at an angle to the first and second orthogonal sets of grid lines;

positioning the lenslet array such that each lenslet has a subaperture centered close to the midpoint of a line between two adjacent points of interest;

placing a single camera sensor array next to the lenslet array to receive light therefrom, wherein the sensor array has a plurality of sensor cells greater in number, per unit area, than the number of lenslets per unit area;

orienting the sensor array to coincide with the first and second sets of orthogonal grid lines;

activating selected cells in the sensor array, wherein the selected cells are bicells positioned approximately over the center of each subaperture of the lenslet array; and obtaining a bi-cell measurement for each pair of adjacent points of interest, the bi-cell measurement being indicative of phase tilt in the direction between the adjacent points of interest.

8. A method as defined in claim 7, wherein:

the camera sensor array is a rectangular array of bi-cells, each of which is approximately one-fourth the area of a square defined by four adjacent points of interest;

the activating step includes activating only alternate bi-cells in each column and row of the sensor array; and each active bi-cell is positioned at the mid-point of a line between two adjacent points of interest, to measure the tilt with respect to the direction of that line.

9. A method as defined in claim 7, wherein:

the camera sensor array is a rectangular array of cells, each of which is approximately one-ninth the area of a square defined by four adjacent points of interest;

the activating step includes activating only selected adjacent pairs of cells in each column and row of the sensor array, to form active bi-cells spaced along the orthogonal sets of grid lines;

only four of every nine cells are activated; and each active bi-cell is positioned at the mid-point of a line between two adjacent points of interest, to measure the tilt with respect to the direction of that line.

10. A method as defined in claim 7, wherein the step of orienting the lenslet array includes orienting the lenslet array at an angle of approximately 45 degrees to the first and second orthogonal sets of grid lines.

* * * * *